(12) United States Patent
Fu et al.

(10) Patent No.: US 11,095,126 B2
(45) Date of Patent: Aug. 17, 2021

(54) ANTI-ISLANDING PROTECTION SYSTEM

(71) Applicants: STATE GRID ZHEJIANG ELECTRIC POWER CO., LTD. TAIZHOU POWER SUPPLY COMPANY, Zhejiang (CN); STATE GRID CORPORATION OF CHINA, Beijing (CN)

(72) Inventors: Xiaoping Fu, Zhejiang (CN); Wenqi He, Zhejiang (CN); Chi Zhang, Zhejiang (CN); Dongbo Zhang, Zhejiang (CN); Daojian Hong, Zhejiang (CN); Yuande Zheng, Zhejiang (CN); Minzhi Chen, Zhejiang (CN); Mingxu Chen, Zhejiang (CN); Zhen Huang, Zhejiang (CN); Guode Ying, Zhejiang (CN)

(73) Assignees: State Grid Zhejiang Electric Power Co., Ltd. Taizhou Power Supply Company, Taizhou (CN); State Grid Corporation of China, Beijing (CN)

(*) Notice: Subject to any disclaimer, the term of this patent is extended or adjusted under 35 U.S.C. 154(b) by 0 days.

(21) Appl. No.: 16/631,627

(22) PCT Filed: Feb. 27, 2019

(86) PCT No.: PCT/CN2019/076242
§ 371 (c)(1),
(2) Date: Jan. 16, 2020

(87) PCT Pub. No.: WO2020/010850
PCT Pub. Date: Jan. 16, 2020

(65) Prior Publication Data
US 2020/0176995 A1 Jun. 4, 2020

(30) Foreign Application Priority Data

Jul. 9, 2018 (CN) .......................... 201810743587.3

(51) Int. Cl.
H02J 7/22 (2006.01)
H02J 3/38 (2006.01)
(Continued)

(52) U.S. Cl.
CPC ................ *H02J 3/388* (2020.01); *H02B 1/28* (2013.01); *H02B 1/46* (2013.01); *H02H 7/22* (2013.01); *H02J 3/381* (2013.01)

(58) Field of Classification Search
CPC .. H02J 3/388; H02J 3/381; H02B 1/48; H02B 1/28; H02B 1/46; H02H 7/22
See application file for complete search history.

(56) References Cited

U.S. PATENT DOCUMENTS

2011/0309690 A1 12/2011 West
2014/0001863 A1* 1/2014 Zhang ..................... G21D 1/02
307/66

(Continued)

FOREIGN PATENT DOCUMENTS

| CN | 104124706 A | 10/2014 |
| CN | 106253336 A | 12/2016 |
| CN | 109066767 A | 12/2018 |
| CN | 208352991 U | 1/2019 |

OTHER PUBLICATIONS

Machine translation of CN106253336A on Mar. 2, 2021, 23 pages. (Year: 2021).*
Machine translation of CN 104124706A on Mar. 2, 2021, 9 pages (Year: 2021).*

*Primary Examiner* — Harry R Behm
(74) *Attorney, Agent, or Firm* — Arent Fox LLP

(57) ABSTRACT

Provided is an anti-islanding protection system. The system is applied to a low-voltage distributed generation resource (DGR) and includes a box, a reverse power protector, a protection module and an output controller. The reverse power protector has an end connected to a first current transformer and has another end connected to the output (Continued)

controller. The reverse power protector is configured to provide reverse power protection for the low-voltage DGR. The output controller has an end connected to the protection module and the reverse power protector and has another end connected to a grid-connection switch of the low-voltage DGR. The output controller is configured to control the grid-connection switch to turn off when reserve power is detected. The protection module has an end connected to a second current transformer and has another end connected to the output controller. The protection module is configured to provide low-frequency protection, over-frequency protection, over-voltage protection and low-voltage protection for the low-voltage DGR.

7 Claims, 2 Drawing Sheets

(51) Int. Cl.
    *H02B 1/28*     (2006.01)
    *H02B 1/46*     (2006.01)
    *H02H 7/22*     (2006.01)

(56) References Cited

U.S. PATENT DOCUMENTS

2017/0155279 A1*   6/2017   Eckhardt ........... H02J 13/00034
2018/0166887 A1*   6/2018   Ridley .................... H02J 3/381

* cited by examiner

ANTI-ISLANDING PROTECTION SYSTEM

CROSS REFERENCE TO RELATED APPLICATIONS

This application is a United States National Stage Application of co-pending International Patent Application Number PCT/CN2019/076242, filed on Feb. 27, 2019, which claims priority to Chinese patent application No. 201810743587.3 filed Jul. 9, 2018, the contents of which are incorporated herein by reference in their entirety.

TECHNICAL FIELD

The present application relates to an anti-islanding protection system.

BACKGROUND

The anti-islanding protection system is an important protection system for a distributed generation resource (DGR) in a distribution room. The anti-islanding protection is required to implement an active detection method and a passive detection method. The active detection method includes an active frequency drift (AFD) method, disturbance on active power, and disturbance on reactive power. The passive detection method includes detection of voltage phase jumps and detection of frequency changes. An islanding protection trip outlet is generally connected to a grid-connection circuit breaker. When an islanding phenomenon occurs, the grid-connection circuit breaker is cut off, so the anti-islanding protection system is required to have a capability of accurately detecting the voltage and frequency of a grid-connection point.

When the voltage and frequency fluctuate and are larger than a determined range, the trip outlet acts to turn off the grid-connection switch. However, the anti-islanding protection system installed at a boundary point of the DGR at present cannot implement 100% anti-islanding operation. This leaves potential safety hazards for scheduled outage maintenance of devices at a power grid side.

SUMMARY

The following is a summary of the subject matter described herein in detail. This summary is not intended to limit the scope of the claims.

The application provides an anti-islanding protection system, so as to avoid the situation that the related anti-islanding protection system leaves potential safety hazards during outage maintenance at the power grid side.

The present application adopts the technical solution described below. Provided is an anti-islanding protection system, which is applied to a low-voltage DGR and includes a box, a reverse power protector, a protection module and an output controller. The reverse power protector, the protection module and the output controller are all disposed in the box. The reverse power protector has an end connected to a first current transformer and has another end connected to the output controller. The first current transformer is installed on a low-voltage side of a transformer of the low-voltage DGR, and the reverse power protector is configured to provide reverse power protection for the low-voltage DGR. The output controller has an end connected to the protection module and the reverse power protector and has another end connected to a grid-connection switch of the low-voltage DGR. The output controller is configured to control the grid-connection switch to turn off when reverse power is detected. The protection module has an end connected to the output controller and has another end connected to a second current transformer. The second current transformer is connected on an input side of the grid-connection switch of the low-voltage DGR. The protection module is configured to provide low-frequency protection, over-frequency protection, over-voltage protection and low-voltage protection for the low-voltage DGR.

Other aspects can be understood after the drawings and the detailed description are read and understood.

BRIEF DESCRIPTION OF DRAWINGS

The present application will be further described with reference to the drawings.

LIST OF REFERENCE NUMBERS

1: box; 10: push rod; 11: horizontal transverse plate; 12: first placement cavity; 13: second placement cavity; 14: power supply; 15: U-shaped groove; 16: box cover; 17: inclined portion; 18: connecting rod; 19: compression washer; 2: reverse power protector; 21: first current transformer; 3: protection module; 31: second current transformer; 4: output controller; 5: plastic optical fiber; 6: unidirectional switch quantity infrared intrusion optical transmitter; 7: concrete base; 8: grid-connection switch.

DETAILED DESCRIPTION

Figure 1:
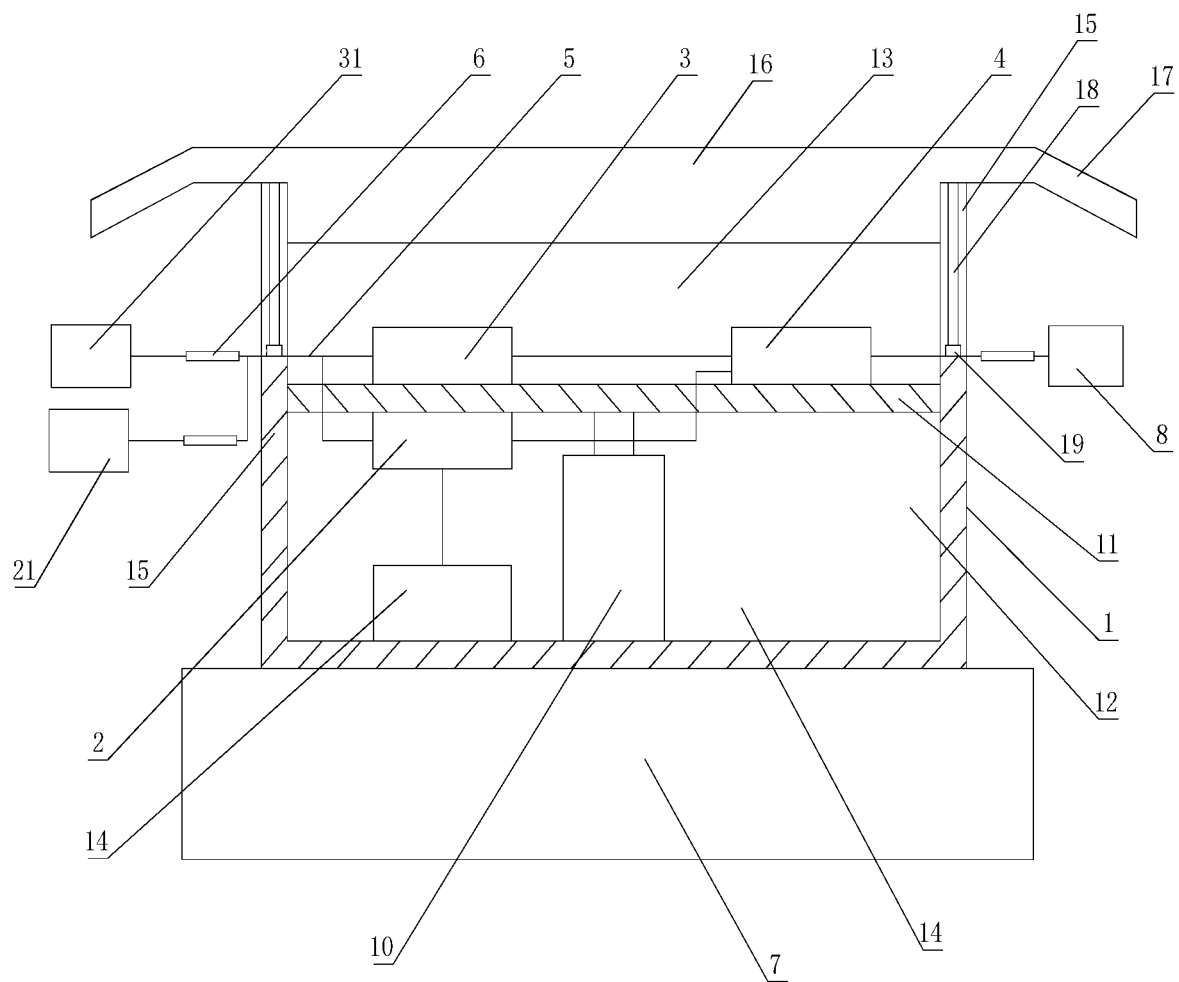
FIG. 1 is a structural diagram of an anti-islanding protection system according to an embodiment of the present application.
Figure 2:
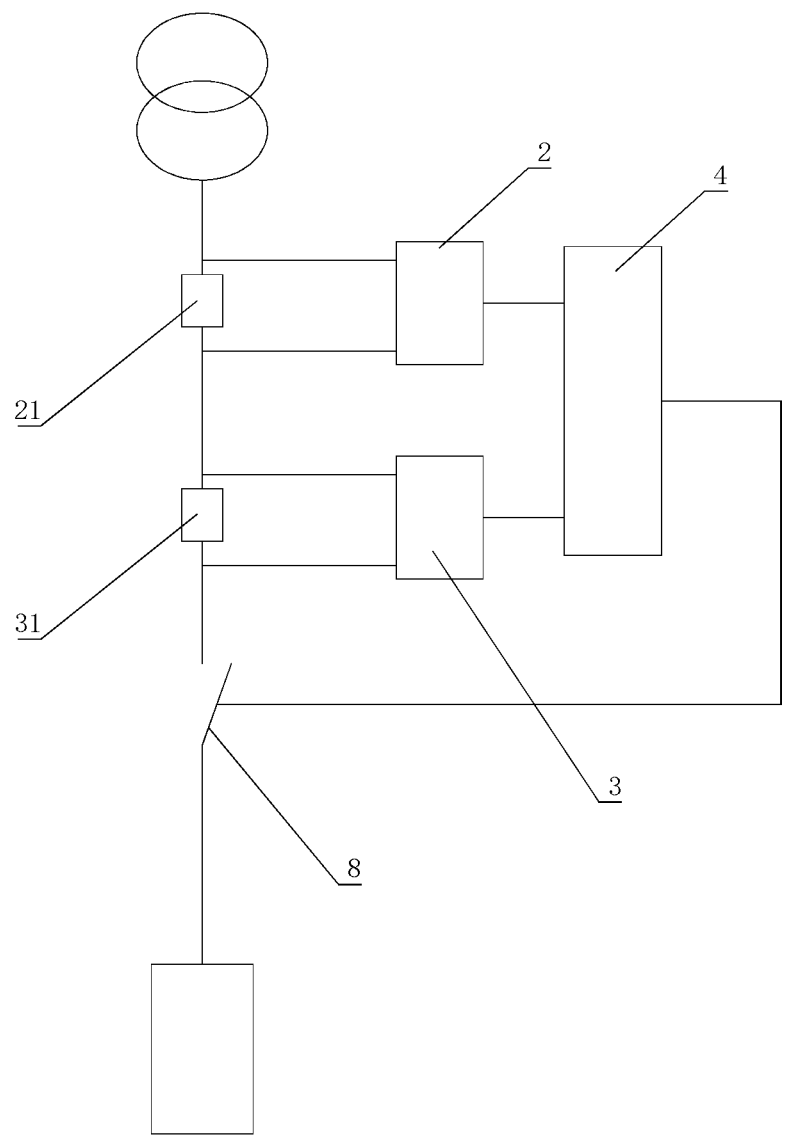
FIG. 2 is a structural diagram of an anti-islanding protection system installed on a low-voltage distributed generation resource according to an embodiment of the present application.

As shown in FIGS. 1 and 2, a zero-blind-area anti-islanding protection system of low-voltage distributed power supply includes a box 1, a reverse power protector 2, a protection module 3 and an output controller 4. The reverse power protector 2, the protection module 3 and the output controller 4 are all disposed in the box 1. The protection module 3 includes a low-frequency protection unit, an over-frequency protection unit, an over-voltage protection unit and a low-voltage protection unit. When the current has low frequency, over frequency, low voltage or over voltage, a forcing switch-off command may be immediately delivered to a grid-connection switch of the low-voltage DGR through the output controller, thereby ensuring the normal operation of the line. The reverse power protector 2 has an end connected to a first current transformer 21. The first current transformer 21 is installed on a low-voltage side of a transformer of a low-voltage DGR 14. The reverse power protector 2 has another end connected to the output controller 4. The protection module 3 has an end connected to a second current transformer 31. The second current transformer 31 is installed on an input side of the grid-connection switch 8 of the low-voltage DGR 14. The protection module 3 has another end connected to the output controller 4. The output controller 4 is connected to the grid-connection switch 8 of the low-voltage DGR 14. The current of the low-voltage side of the transformer is detected through the first current transformer connected to the reverse power protector. When a reverse current is detected, a forcing switch-off command may be immediately delivered to the grid-connection switch of the low-voltage DGR through the output controller, thus completely ensuring no existence of islanding, ensuring that the DGR will not return high-voltage power to the 10 KV line through the transformer, ensuring the safety of the repair or maintenance personnel, and avoiding the occurrence of mass casualties.

In the related art, the anti-islanding protection system is installed at the grid-connection switch to control the grid-connection switch to turn off, so that the protection function is implemented. The DGR user is capable of install the system. The anti-islanding protection system in the embodiments of the present application is installed in a distribution room by an electric power company. The system not only has the conventional protection function of the anti-islanding system, but also has the function of collecting values of the voltage and current at a low-voltage main switch of a distribution transformer to determine the reverse power, thereby implementing the reverse power protection, and ensuring the operation safety of the power grid and the safety of repair and maintenance personnel on the whole.

A push rod 10 is disposed in the box 1. A horizontal transverse plate 11 is disposed above the push rod 10. The horizontal transverse plate 11 divides the box 1 into a first placement cavity 12 and a second placement cavity 13. The protection module 3 and the output controller 4 are installed on the horizontal transverse plate 11 and are located in the second placement cavity 13. The reverse power protector 2 is installed on the horizontal transverse plate 11 and is located in the first placement cavity 12. The first placement cavity is provided with a power supply 14 electrically connected to the reverse power protector. The setting of horizontal transverse plate can ensure the unified installation of reverse power protector, the protection module and the output controller, optimizes the inner space of the box, benefits the placement of the power supply, saves the installation costs, and can adapt to different installation environment. The setting of the power supply can ensure the continuous operation of the reverse power protector, and ensure the stable operation of the anti-islanding protection system. By setting the horizontal transverse plate on the push rod, the horizontal transverse plate is released through the extension of the push rod, which benefits the maintenance personnel to maintain the system, and improves maintenance efficiency and maintenance quality. In addition, the reverse power protector 2 can normally operate when the voltage of the power grid changes within the range of ±10% of a rated voltage and the frequency changes within the range of ±5% of a rated frequency. The power supply uses a two-phase power supply of 400V 50 Hz/60 Hz alternating current (AC), and a rated input current is 5 A two-phase AC current. When a reverse power value of a set running in parallel reaches 3% to 15% of rated power and the delay is 3 to 10 seconds, a reverse power relay works. In order to reduce the installation area of the protection module 3, the protection module 3 in this embodiment further includes a cassette. The low-frequency protection unit, the over-frequency protection unit, the over-voltage protection unit and the low-voltage protection unit are all disposed on the cassette.

The reverse power protector 2 is connected to the first current transformer 21 through a plastic optical fiber 5, the protection module 3 is connected to the second current transformer 31 through a plastic optical fiber 5, and the output controller 4 is connected to the grid-connection switch 8 through a plastic optical fiber 5. The plastic optical fiber 5 is provided with a unidirectional switch quantity infrared intrusion optical transmitter and receiver 6. The plastic optical fiber 5 and the unidirectional switch quantity infrared intrusion optical transmitter and receiver 6 can improve the speed of anti-islanding protection.

The box is provided with a U-shaped groove 15 for the plastic optical fiber to run through, and the U-shaped groove is provided with a protection layer. The U-shaped groove can ensure that the plastic optical fiber is quickly installed on the box, optimize the wiring of the plastic optical fiber, and reduce the length of the plastic optical fiber. The setting of the protective layer can ensure the installation quality of the plastic optical fiber, and reduce the damage to the plastic optical fiber.

In addition, the box 1 is provided with a box cover 16, and the box cover 16 is provided with an inclined portion 17 that is inclined downward. The setting of the box cover 16 can implement sealing of the box 1, which benefits the quick installation and maintenance of the reverse power protector 2, the protection module 3 and the output controller 4. The setting of the inclined portion 17 can prevent rainwater from entering the box 1, and improve the safety performance during operation of the anti-islanding protection system.

The box cover 16 is provided with a connecting rod 18 extending into the U-shaped groove, and a compression washer 19 is disposed at a bottom end of the connecting rod 18 and is in contact with the plastic optical fiber. During the use, the sealing of the U-shaped groove is implemented through the connecting rod extending into the U-shaped groove, which avoids dust or debris to get into the box. Moreover, the setting of the compression washer can ensure the stability of the plastic optical fiber, avoid rotation and axial shaking of the plastic optical fiber, and benefit fixed installation of the plastic optical fiber.

The box 1 is provided with a concrete base 7. The box 1 is installed on the ground along with the concrete base 7. The concrete base 7 can ensure that the box 1 can be steadily installed on the ground and installed near a user equipment of the low-voltage DGR 14, which can further improve the safety performance during operation of the anti-islanding protection system.

What is claimed:

1. An anti-islanding protection system, applied to a low-voltage distributed generation resource (DGR), wherein the system comprises a box, a reverse power protector, a protection module and an output controller, wherein the reverse power protector, the protection module and the output controller are disposed in the box;

the reverse power protector has an end connected to a first current transformer and has another end connected to the output controller, the first current transformer is disposed on a low-voltage side of a transformer of the low-voltage DGR, and the reverse power protector is configured to provide reverse power protection for the low-voltage DGR;

the output controller has an end connected to the protection module and the reverse power protector and has another end connected to a grid-connection switch of the low-voltage DGR, the output controller is configured to control the grid-connection switch to turn off when reverse power is detected; and the protection module has an end connected to the output controller and has another end connected to a second current transformer, the second current transformer is connected on an input side of the grid-connection switch of the low-voltage DGR, the protection module is configured to provide low-frequency protection, over-frequency protection, over-voltage protection and low-voltage protection for the low-voltage DGR, wherein a push rod is disposed in the box, a horizontal transverse plate is disposed above the push rod, the horizontal transverse plate divides the box into a first placement cavity and a second placement cavity; the protection module and the output controller are installed on the horizontal transverse plate and are located in the second placement cavity, the reverse power protector is installed on the horizontal transverse plate and is located in the first placement cavity, and the first placement cavity is provided with a power supply electrically connected to the reverse power protector to supply power to the reverse power protector.

2. The system of claim 1, wherein the protection module comprises a low-frequency protection unit, an over-frequency protection unit, an over-voltage protection unit and a low-voltage protection unit.

3. The system of claim 1, wherein the reverse power protector is connected to the first current transformer through a plastic optical fiber, the protection module is connected to the second current transformer through a plastic optical fiber, and the output controller is connected to the grid-connection switch through a plastic optical fiber, wherein each plastic optical fiber is provided with a unidirectional switch quantity infrared intrusion optical transmitter and receiver.

4. The system of claim 3, wherein the box is provided with a U-shaped groove for the plastic optical fiber to run through, and the U-shaped groove is provided with a protection layer.

5. The system of claim 4, wherein the box is provided with a box cover, and the box cover is provided with an inclined portion that is inclined downward.

6. The system of claim 5, wherein the box cover is provided with a connecting rod extending into the U-shaped groove, and a compression washer is disposed at a bottom end of the connecting rod and is in contact with the plastic optical fiber.

7. The system of claim 1, wherein the box is provided with a concrete base, and the box is installed on ground along with the concrete base.

* * * * *